United States Patent
Schaer et al.

(10) Patent No.: US 10,414,036 B2
(45) Date of Patent: Sep. 17, 2019

(54) CONTROL METHOD FOR A HAMMER DRILL

(71) Applicant: Hilti Aktiengesellschaft, Schaan (LI)

(72) Inventors: Roland Schaer, Grabs (CH); Antonios Draganis, Bad Woerishofen (DE); Peter Hricko, Buchs (CH); Franz Moessnang, Stadtbergen (DE); Erwin Manschitz, Germering (DE)

(73) Assignee: Hilti Aktiengesellschaft, Schaan (LI)

( * ) Notice: Subject to any disclaimer, the term of this patent is extended or adjusted under 35 U.S.C. 154(b) by 295 days.

(21) Appl. No.: 15/528,216

(22) PCT Filed: Nov. 17, 2015

(86) PCT No.: PCT/EP2015/076799
§ 371 (c)(1),
(2) Date: May 19, 2017

(87) PCT Pub. No.: WO2016/079108
PCT Pub. Date: May 26, 2016

(65) Prior Publication Data
US 2017/0320205 A1    Nov. 9, 2017

(30) Foreign Application Priority Data
Nov. 20, 2014 (EP) ..................... 14194081

(51) Int. Cl.
*B25D 16/00* (2006.01)
*B25F 5/00* (2006.01)
(Continued)

(52) U.S. Cl.
CPC .......... *B25D 16/00* (2013.01); *B25D 16/006* (2013.01); *B25F 5/001* (2013.01);
(Continued)

(58) Field of Classification Search
CPC .... B25D 16/00; B25D 16/003; B25D 16/006; B25D 11/00; B25D 11/005;
(Continued)

(56) References Cited

U.S. PATENT DOCUMENTS

| 3,507,337 A | 4/1970 | Chromy et al. | |
|---|---|---|---|
| 6,044,918 A * | 4/2000 | Noser ................... | B25D 16/00 173/176 |
| 6,111,515 A * | 8/2000 | Schaer ..................... | B25F 5/00 340/679 |
| 6,484,814 B2 * | 11/2002 | Bongers-Ambrosius ................... | B25D 16/00 173/176 |

(Continued)

FOREIGN PATENT DOCUMENTS

DE 102012208870 11/2013
EP 1452278 9/2004
(Continued)

*Primary Examiner* — Scott A Smith
(74) *Attorney, Agent, or Firm* — Davidson, Davidson & Kappel, LLC

(57) ABSTRACT

The control method for a hammer drill (1) provides the following steps. During basic operation, the motor (5) rotates at an operating speed for the drilling operation with chiseling action in order to rotationally drive the tool holder (2) and to drive the hammer mechanism (6) with a nominal striking power. The torque coupling (21) is monitored with the aid of a sensor (26). If a disengagement of the torque coupling (21) occurs, the striking power of the hammer mechanism (6) is reduced to below 10% of the nominal striking power during a disengagement of the torque coupling (21), and the torque coupling (21) is driven. When the disengagement of the torque coupling (21) ends, the striking power of the hammer mechanism (6) is increased to the nominal striking power and the torque coupling (21) is driven at the operating speed for the drilling operation with chiseling action.

3 Claims, 1 Drawing Sheet

(51) Int. Cl.
  *B23Q 11/00* (2006.01)
  *B23Q 11/04* (2006.01)
  *B25D 11/00* (2006.01)
  *B23Q 17/22* (2006.01)

(52) U.S. Cl.
  CPC .......... *B23Q 11/0092* (2013.01); *B23Q 11/04* (2013.01); *B23Q 17/22* (2013.01); *B25D 11/005* (2013.01); *B25D 2211/068* (2013.01); *B25D 2250/035* (2013.01); *B25D 2250/165* (2013.01); *B25D 2250/201* (2013.01); *B25D 2250/221* (2013.01)

(58) Field of Classification Search
  CPC ........ B25D 2211/061; B25D 2211/068; B25D 2250/035; B25D 2250/165; B25D 2250/195; B25D 2250/201; B25D 2250/221; B25F 5/00; B25F 5/001; B23Q 11/04; B23Q 11/0092; B23Q 17/22; B23Q 17/2428
  USPC .. 173/1, 2, 4, 176, 178, 181, 182, 217, 201, 173/48, 128, 109; 192/48.2, 56.42, 192/84.96; 340/679, 680, 686.5, 684
  See application file for complete search history.

(56) References Cited

U.S. PATENT DOCUMENTS

| | | | |
|---|---|---|---|
| 6,520,266 B2 * | 2/2003 | Bongers-Ambrosius | B25D 11/12 173/115 |
| 6,843,327 B2 * | 1/2005 | Meixner | B25D 11/125 173/10 |
| 6,863,165 B2 * | 3/2005 | Koslowski | B25F 5/001 173/178 |
| 6,981,557 B2 | 1/2006 | Boeni et al. | |
| 8,833,484 B2 | 9/2014 | Binder et al. | |
| 9,969,071 B2 * | 5/2018 | Nitsche | B25D 16/006 |
| 2005/0230130 A1 * | 10/2005 | Strasser | B25F 5/00 173/2 |
| 2008/0289839 A1 * | 11/2008 | Hricko | B25B 21/00 173/1 |
| 2015/0129248 A1 | 5/2015 | Nitsche et al. | |

FOREIGN PATENT DOCUMENTS

| | | |
|---|---|---|
| EP | 2447010 | 5/2012 |
| EP | 2497608 | 9/2012 |
| WO | WO8806508 | 9/1988 |

* cited by examiner

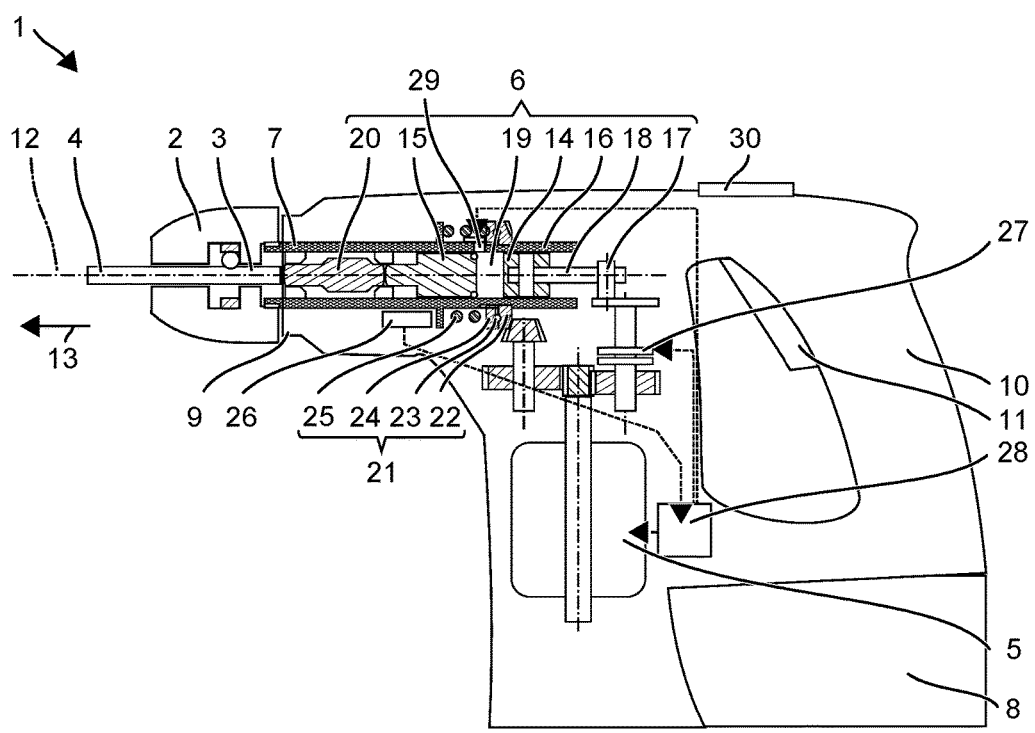

CONTROL METHOD FOR A HAMMER DRILL

TECHNICAL FIELD OF THE INVENTION

The present invention relates to a control method for a hammer drill.

A hammer drill of the type known from U.S. Pat. No. 3,507,337A is used for drilling holes in reinforced concrete. The hammer drill rotates a drill bit about its axis and periodically strikes the end of the drill bit. The drill bit may get jammed on a reinforcing bar during rotation. The jamming effect may become so great that the drill bit may no longer be removed from the drilled hole.

SUMMARY OF THE INVENTION

A control method for a hammer drill according to the present invention provides the following steps. In the basic operating mode, the motor rotates at an operating speed for the drilling operation with chiseling action in order to rotationally drive the tool holder and to drive the hammer mechanism with a nominal striking power. The torque coupling is monitored with the aid of a sensor. If a disengagement of the torque coupling occurs, the striking power of the hammer mechanism is reduced to below 10% of the nominal striking power during a disengagement of the torque coupling, and the torque coupling is rotationally driven. Although the rotation is blocked, it proves to be advantageous that a torque continues to be applied to the drill bit. The hammer mechanism must be shut off for this purpose, however. Otherwise, the jamming effect intensifies. The hammer drill returns to its operating mode when the drill bit comes loose. When the disengagement of the torque coupling ends, the striking power of the hammer mechanism is increased to the nominal striking power and the torque coupling is driven at the operating speed for the drilling operation with chiseling action.

One embodiment provides the following steps for a rotating operation without a chiseling action. The motor runs at an operating speed for the rotating operation in order to rotationally drive the tool holder. The torque coupling is monitored with the aid of the sensor. Upon disengagement of the torque coupling, either the speed of the motor is reduced to the extent that the torque coupling does not disengage further, or the speed remains unchanged, as the operating speed.

BRIEF DESCRIPTION OF THE DRAWING

The following description explains the present invention on the basis of exemplary specific embodiments.

FIG. 1 shows a hammer drill.

Identical or functionally identical elements are indicated by identical reference numerals in the drawing, unless indicated otherwise.

DETAILED DESCRIPTION OF THE INVENTION

FIG. 1 schematically shows a hammer drill 1 by way of example of a chiseling hand-held power tool. Hammer drill 1 includes a tool holder 2, into which a shaft end 3 of a tool, e.g., a drill bit 4, may be inserted. A motor 5, which drives a hammer mechanism 6 and an output shaft 7, forms a primary drive of hammer drill 1. A battery pack 8 or a mains power line supplies motor 5 with current. Hammer mechanism 6, motor 5, and further drive components are situated in a power-tool housing 9. A user may guide hammer drill 1 with the aid of a handle 10 fastened on power-tool housing 9 and may start hammer drill 1 with the aid of a system switch 11. During operation, hammer drill 1 continuously rotates drill bit 4 about a working axis 12 and may thereby hammer drill bit 4 into a substrate in direction of impact 13 along working axis 12.

Hammer mechanism 6 is a pneumatic hammer mechanism 6. A hammer piston 14 and a hammer 15 are movably guided along working axis 12 in a guide tube 16 in hammer mechanism 6. Hammer piston 14 is coupled to motor 5 via an eccentric tappet 17 and is forced to perform a periodic, linear motion. A connecting rod 18 connects eccentric tappet 17 to hammer piston 14. A pneumatic spring formed by a pneumatic chamber 19 between hammer piston 14 and hammer 15 couples a motion of hammer 15 to the motion of hammer piston 14. Hammer 15 may strike directly onto a rear end of drill bit 4 or may indirectly transfer a portion of its impulse onto drill bit 4 via an essentially resting striker 20.

A torque coupling 21 is situated in the drive section between motor 5 and tool holder 2. Torque coupling 21 disengages when an applied torque exceeds a disengagement threshold. Tool holder 2 is decoupled from motor 5 by torque coupling 21. Torque coupling 21 is coupled back in after a short time. If the torque continues to exceed the disengagement threshold, torque coupling 21 disengages again. The disengagement and coupling repeats until either drill bit 4 is pried free or the user shuts off hammer drill 1.

Exemplary torque coupling 21 includes a disk 22, which is driven by motor 5 and engages via multiple blocking elements 23 into pockets of an output-side disk 24. A coil spring 25 keeps the two disks 22, 24 engaged. If the applied torque exceeds the disengagement threshold, one of the disks moves against the force of coil spring 25 until blocking elements 23 are disengaged. Torque coupling 21 disengages. The torque transmission is very low for the period of time during which blocking elements 23 are disengaged. The torque transmission starts again when blocking elements 23 engage again, into the next pocket or the second pocket. If the torque still exceeds the engagement threshold, blocking elements 23 disengage again. A pulsed torque transmission results, the mean torque of which is substantially lower than is the case for engaged torque coupling 21 having a permanent engagement of blocking elements 23.

Hammer drill 1 deactivates hammer mechanism 6 when torque coupling 21 disengages. Hammer 15 of hammer mechanism 6 preferably comes to a complete standstill. The speed of hammer 15 is reduced at least to the extent that the striking power drops to below one-tenth of the normal operating value. Drill bit 4 has no further or almost no further chiseling material-removal capability. Torque coupling 21 continues to be rotationally driven, in order to transfer a torque to tool holder 2. Disengaging torque coupling 21 transfers a pulsed torque to tool holder 2. Hammer drill 1 therefore switches from a drilling operation with chiseling action to a pulsed drilling operation without a chiseling action. Hammer mechanism 6 is reactivated, i.e., the striking power is increased to the operating value, when torque coupling 21 engages. Hammer drill 1 switches back to the drilling operating mode with chiseling action, which was possibly selected by the user. The rotary actuator for torque coupling 21 is deactivated when the user shuts off hammer drill 1 via system switch 11.

A sensor 26 may detect the disengagement of torque coupling 21. Sensor 26 preferably measures rotary motions about working axis 12 or any other vibrations or accelerations generated by the repeated disengagement and engagement of torque coupling 21. The period of time between the disengagement and the engagement is essentially predefined by the speed of driven disk 22 and the number of blocking elements 23. A bandpass filter of sensor 26 has a pass frequency range corresponding to the period of time. Sensor 26 filters the measuring signals with the aid of the bandpass filter and, if the filtered measuring signal exceeds a threshold value, sensor 26 signals a disengagement of torque coupling 21. Sensor 26 may detect a position or motion of movable disk 24. A deflection out of the engagement position is signaled as a disengagement of torque coupling 21. In addition, the speed at the drive-side disk and output-side disk 24 may be detected and compared with the aid of a speed sensor. A deviation is signaled as a disengagement of torque coupling 21.

The shutoff of hammer mechanism 6 may take place in different ways. For example, a clutch 27 may be situated upstream from eccentric tappet 17. A controller 28 disengages clutch 27 when sensor 26 signals a disengagement of torque coupling 21. Hammer piston 14 remains at a standstill. Consequently, hammer 15 also remains at a standstill. Controller 28 engages clutch 27 when sensor 26 signals that torque coupling 21 is not disengaged. Hammer piston 14 moves again and prompts hammer 15 to move.

One embodiment provides a ventilation flap 29 in the area of pneumatic chamber 19. Controller 28 opens ventilation flap 29 when sensor 26 signals a disengagement of torque coupling 21. Pneumatic chamber 19 is ventilated. The air moved by hammer piston 14 may escape or flow in at ventilation flap 29, whereby no pressure is built up in pneumatic chamber 19 even though hammer piston 14 is moving. Hammer 15 is not coupled or is only weakly coupled to hammer piston 14 and therefore remains at a standstill or is very slow. Controller 28 closes ventilation flap 29 when sensor 26 signals an engaged torque coupling 21. Pneumatic chamber 19 is closed, hammer piston 14 may build up pressure, and hammer 15 is therefore coupled again and moves.

One embodiment provides for the speed of motor 5 to be reduced to a shutoff value for hammer mechanism 6. At the shutoff value, the coupling of hammer 15 to hammer piston 14 drops to the point at which hammer 15 remains completely or almost at a standstill. The shutoff value is not zero. Instead, motor 5 continues to apply an essential torque to torque coupling 21 or tool holder 2 at the speed equal to the shutoff value.

The speed of motor 5 is designed for an optimal excitation of hammer 15 during operation. The periodicity of hammer piston 14 and the number of strikes by hammer mechanism 6 may be changed only within a narrow window. The reason therefor is, inter alia, the low coupling strength of the pneumatic spring. The number of strikes is matched to a resonant excitation of the mass-spring system formed by the pneumatic spring and hammer 15. Controller 28 reduces the speed from the operating value for the number of strikes to the shutoff value. The shutoff value may be empirically ascertained. At the shutoff value, the coupling of hammer 15 to hammer piston 14 is so weak that hammer 15 comes to a complete standstill or a striking power becomes negligibly low, e.g., lower than one-tenth of the normal striking power. Tool holder 2 is to continue to be rotated. The shutoff value is therefore greater than zero. The shutoff value is selected to be as high as possible because torque coupling 21 exerts an increasing repercussive torque on the user as the speed decreases. The shutoff value is preferably greater than 80% of the minimum speed at which hammer 15 couples to hammer piston 14. The lower limit for the shutoff value is therefore just at the threshold at which hammer mechanism 6 is still active. The shutoff value is preferably lower than a speed at which the striking power is 10% of the nominal striking power of hammer drill 1.

One exemplary control method is described in the following. The control method is carried out by a controller 28, e.g., a microprocessor, of hammer drill 1.

The user actuates system switch 11. Controller 28 accelerates motor 5 to the operating speed in response to the actuation of system switch 11. Hammer mechanism 6 is active and hammer 15 periodically strikes drill bit 4 with the number of strikes. Controller 28 samples sensor 26. If drill bit 4 becomes blocked or moves sluggishly, the torque threshold of torque coupling 21 is exceeded. Torque coupling 21 disengages. Sensor 26 signals the disengagement to controller 28. Controller 28 shuts off hammer mechanism 6. For example, the speed of motor 5 is reduced to the shutoff value. Motor 5 may be braked for this purpose, e.g., via short-circuiting. There is no need for a rapid shutoff of the hammer mechanism, however. Preferably, motor 5 runs down, in order to reduce the speed relatively slowly. A one-time disengagement of torque coupling 21 therefore does not result in an interim shutoff of hammer mechanism 6. Hammer mechanism 6 remains deactivated for as long as sensor 26 signals a disengagement of torque coupling 21. The rotary actuator continues to rotate in the meantime and drives torque coupling 21 at the shutoff value. As soon as sensor 26 signals that torque coupling 21 has engaged, motor 5 is accelerated to the operating speed. Hammer mechanism 6 is activated as a result.

Independently of whether torque coupling 21 is disengaged or engaged, motor 5 is shut off when the user releases system switch 11 and therefore shuts off hammer drill 1.

Hammer drill 1 may include a selector switch 30 which allows for a selection between at least one drilling operating mode with chiseling action and a purely drilling operating mode. Controller 28 operates in the drilling operating mode with chiseling action according to the above-described method. In the purely drilling operating mode, motor 5 likewise rotates at an operating speed which is preferably power-limited by motor 5. The operating speed may differ from the operating speed for the drilling operating mode with chiseling action, since the resonant excitation of hammer 15 is not required. Controller 28 monitors torque coupling 21 and sensor 26. Upon disengagement of torque coupling 21, the speed is preferably reduced to the point at which torque coupling 21 no longer disengages. Motor 5 may also be shut off completely, i.e., the speed is reduced to zero. Alternatively, the operating speed may be retained. The user decides whether he/she should respond to the disengagement of torque coupling 21.

What is claimed is:

1. A control method for a hammer drill including a tool holder, a motor, a torque coupling situated between the motor and the tool holder, and a pneumatic hammer mechanism driven by the motor, the control method, in a drilling operation with chiseling action, carrying out the following steps:

operating the motor at an operating speed for the drilling operation with chiseling action in order to rotationally drive the tool holder and to drive the hammer mechanism with a nominal striking power;

monitoring the torque coupling with the aid of a sensor;

a striking power of the hammer mechanism being reduced to less than 10% of the nominal striking power during a disengagement of the torque coupling, the torque coupling being rotationally driven; and the striking power of the hammer mechanism being increased to the nominal striking power and the torque coupling being driven at the operating speed for the drilling operation with chiseling action when the disengagement of the torque coupling ends.

2. The control method as recited in claim 1 comprising the following steps during a rotating operation without a chiseling action:

operating the motor at a further operating speed for the rotating operation in order to rotationally drive the tool holder;

monitoring the torque coupling with the aid of the sensor;

either reducing the further operating speed of the motor to the extent that the torque coupling does not disengage or the further operating speed is unchanged upon disengagement of the torque coupling.

3. The control method as recited in claim 1 wherein, during the disengagement of the torque coupling, the speed of the motor amounts at least to 80% of a shut off speed of the motor, the pneumatic hammer mechanism shutting off at the shut off speed.

* * * * *